United States Patent [19]

Studer

[11] Patent Number: 5,611,264
[45] Date of Patent: Mar. 18, 1997

[54] DUTCH OVEN TYPE COOKING VESSEL WITH COMBINATION COOKING SURFACE

[76] Inventor: Loye E. Studer, 385 Lake Levise Dr., Tacoma, Wash. 98498

[21] Appl. No.: 451,299

[22] Filed: May 26, 1995

[51] Int. Cl.$^6$ .................................................. A47J 37/00
[52] U.S. Cl. ................................ 99/340; 99/397; 99/423; 99/449
[58] Field of Search ............................. 99/422–425, 339, 99/340, 403, 372–380, 352–357, 385, 393, 397, 410–417, 449, 450, 482; 126/25 R, 9 R, 25 A; 220/212, 333, 329, 331

[56] References Cited

U.S. PATENT DOCUMENTS

| | | | |
|---|---|---|---|
| 461,120 | 10/1891 | McKinley. | |
| 1,778,263 | 10/1930 | Lamb | 99/340 X |
| 1,992,843 | 2/1935 | Serenberg et al. | |
| 2,001,285 | 5/1935 | Rehm | 99/340 |
| 2,313,968 | 3/1943 | Reich | 99/340 X |
| 2,430,582 | 11/1947 | Reich | 99/340 X |
| 2,573,988 | 11/1951 | Saltzberg | 99/421 |
| 2,830,529 | 4/1958 | Jaffe | 99/423 |
| 3,237,552 | 3/1966 | Cronheim | 99/340 |
| 3,537,442 | 11/1970 | Berger | 99/423 |
| 3,623,422 | 11/1971 | Marshall | 99/340 X |
| 3,797,375 | 3/1974 | Cerola | 99/422 X |
| 4,108,141 | 8/1978 | Bauer | 99/422 X |
| 4,197,018 | 4/1980 | Groen, Jr. | 366/248 |
| 4,267,703 | 5/1981 | Minifie et al. | 62/123 |
| 4,343,292 | 8/1982 | Kells et al. | 126/378 |
| 4,439,461 | 3/1984 | Czyzewski et al. | 426/601 |
| 4,445,429 | 5/1984 | Czyzewski et al. | 99/455 |
| 4,491,146 | 1/1985 | Sveds | 137/341 |
| 4,835,369 | 5/1989 | Oslin | 219/439 |
| 4,870,835 | 10/1989 | Wolfe et al. | 62/246 |
| 4,957,039 | 9/1990 | Reyes | 99/340 |
| 5,078,050 | 1/1992 | Smith | 99/483 |

*Primary Examiner*—Timothy F. Simone
*Attorney, Agent, or Firm*—R. Reams Goodloe, Jr.

[57] ABSTRACT

A cooking apparatus for alternately cooking, broiling, or grilling foods in a single vessel. The apparatus includes a lower pan portion which is supported by a lower frame portion. An upper frame portion is pivotally supported from the lower pan portion. A upper lid portion is provided, wherein the lid portion is pivotally affixed to the upper frame portion. The lid portion includes a top portion and a grille portion. The grille portion of the lid is the inner wall surface of the top portion, and is thus located in the upper reaches of the lid portion when the lid portion is in a cooking position. When the lid is rotated one hundred eighty (180) degrees, the grille portion provides an upwardly exposed grille surface for food preparation. The lid portion is shaped suitable for nesting in the bottom portion when the upper frame portion is returned to a normal cooking position. The dutch oven type cook system has heating fluid in the passageways between the double walls and cooks from the sides, top, and bottom with hot oil. Alternately, all or a portion of the unit may be heated electrically. A bottom draw off is provided to allow cryovac chill of the pan contents.

7 Claims, 7 Drawing Sheets

DUTCH OVEN TYPE COOKING VESSEL WITH COMBINATION COOKING SURFACE

TECHNICAL FIELD OF THE INVENTION

This invention relates to a novel dutch oven type cooking apparatus. More particularly, it relates to a dutch oven type cooking apparatus which has a bottom cooking pan portion and an upper top or lid portion, wherein the upper portion is convertible from a cooker pan lid to a stand alone grille.

BACKGROUND

In institutional and commercial kitchens, there is a continuing need to cook foods using different cooking methods. For example, at breakfast, the main meals may be cooked on a grille, but then at lunch or dinner, it may be desirable to deep fry, roast, or simply heat the foods in bulk. Normally, it is necessary to have a variety of different kitchen equipment available, each of which may be used to prepare foods by only one or two cooking techniques. Therefore, multiple equipment items, such as separate grilles, ovens, pans, and kettles are often found in such kitchens. The requirement for multiple equipment increases both the initial capital costs, and the floor space requirements for food preparation kitchens, thus increasing the ultimate cost of food preparation in the kitchen. Thus, particularly in those cooking operations where equipment costs or space constraints are most sensitive, it would be desirable to reduce the number of separate equipment items required. In short, it would be preferable to combine the function of several types of equipment into a single cooking apparatus rather than to limit the menu or reduce capital costs by eliminating certain cooking techniques from the kitchen altogether.

One attempt at a combination type device of which I am aware is illustrated in U.S. Pat. No. 2,430,582, issued Nov. 11, 1947 to Reich for HEATING DEVICE. That patent illustrates, in FIGS. 9–12 and FIGS. 15–17, a cooking device such as a grille which has an upper frame with a pivoting electrical heater to provide from one side direct radiant heat and from the other side conducted heat (through a metal plate); thus this device can be used as a grille or as a broiler.

Another device is illustrated in U.S. Pat. No. 4,957,039, issued Sep. 18, 1990 to Reyes for a FIVE IN ONE COOKER. Reyes illustrates a swivel top portion which can be inverted from a dome configuration where the dome is used as a lid to control the heating of barbecue on grilles below, or to a pan configuration so that food can be cooked in the pan. However, in so far as I am aware, no institutional type dutch oven cookers have been proposed which allow flexibility to switch between cook and grille configurations.

Therefore, a continuing demand exists for a simple, space saving, and relatively inexpensive cooking apparatus which can be used as desired in many different cooking modes. The need for such devices is commonly seen in institutional settings, such as hospitals, prisons, nursing homes, or in commercial restaurant settings, particularly where space is at a premium.

SUMMARY

I have now invented, and disclose herein, a novel, improved cooking vessel which does not have the above-discussed drawbacks common to those heretofore used cooking devices of which I am aware. Unlike cookers heretofore available, my cooking vessel is compact, relatively inexpensive, easy to install and to service, and otherwise superior to the heretofore proposed ones. Most importantly, it is easy to switch between various cooking modes.

I have developed a novel apparatus for heating foods, liquids, or slurries. The apparatus includes a lower frame portion, and a lower pan portion which is supported by the lower frame portion. An upper frame portion is pivotally supported from the lower pan portion. A lid portion is provided, the lid portion being pivotally affixed to the left and right sides of the upper frame portion.

The lid portion includes a top portion and a grille portion. In the preferred embodiment, the grille portion of the lid is the inner wall surface of the top portion, and is thus located in the upper reaches of the lid portion when the lid portion is in a cooking position. When the lid is rotated one hundred eighty (180) degrees, the grille portion provides an upwardly exposed grille surface for food preparation. Also, the lid portion is shaped such that it may be lowered into and nested in the bottom portion when said upper frame portion has been returned to a resting or normal cooking position.

When hot oil or other fluid is used to heat the cooking apparatus, the bottom or lower pan portion further comprises a double wall portion. The double wall portion includes an inner and an outer wall which form a passageway therebetween. The passageway has an inlet and an outlet for the heating fluid to enter and leave the passageway. Heating fluid heats the inner wall which thus heats the food being cooked. The lid portion also further includes a double exterior wall portion, where the double wall portion includes an inner and an outer wall with a passageway therebetween. The passageway has an inlet and an outlet, whereby a heating fluid may be passed into the passageway in the bottom pan portion, or into the passageway in the lid portion, or simultaneously into the bottom pan portion and the top lid portion passageways, so as to heat said foods, liquids, or slurries contained by the cooking apparatus.

Thus it can be seen that my dutch oven type cook system cooks from all sides with hot oil. Alternately, the unit may be heated electrically. The tilt type upper frame and the versatile convertible lid portion allow my cooking apparatus to bake, roast, fry, braise, broil, saute, steam, or kettle cook. The apparatus may also grille in the short order style. A bottom draw off is provided to allow pumping of cooked food into cryovac casings or pouches for ice water chill of cryovac casings, or for blast chill of the pan contents.

The various embodiments provide further variations in the heating configuration and in provision of the heating means. Aside from the foregoing, my novel cooking apparatus is simple, durable, and relatively inexpensive to manufacture.

OBJECTS, ADVANTAGES, AND FEATURES

The apparatus of the present invention has numerous significant advantages over the apparatus currently used in institutional and commercial cooking operations. From the foregoing, it will be apparent to the reader that one important and primary object of the present invention is to provide a single, multipurpose cooking apparatus which allows foods to be cooked in any one of a variety of selected techniques, where the list of possible cooking techniques which may be selected includes baking, roasting, frying, braising, broiling, grilling, steaming, or kettle cooking.

Other important but more specific objects and advantages of the invention reside in the provision of a cooking device as described in the preceding paragraph which:

may be quickly converted from either a pressure cooker to a grille, or vice-versa;

may be used as a steamer;

may be used as a stir fry pan;

may be used as a broiler;

is relatively compact and thereby conserves space;

is relatively simple;

is relatively inexpensive;

allows the foods to be discharged from the apparatus in a simple, one step manner;

Other important objects, features, and additional advantages of my invention will become apparent to the reader from the foregoing and the appended claims and as the ensuing detailed description and discussion proceeds in conjunction with the accompanying drawing.

DRAWINGS

These and other features, aspects and advantages of the present invention will become better understood with reference to the following description, appended claims, and accompanying drawings, wherein:

FIG. 1 is a perspective view of a cooking apparatus constructed in accord with the principles of the present invention, showing the top portion in a position for baking, roasting, broiling, or the like.

In the drawing, like parts will be noted with like reference numerals throughout the various figures, without further comment thereon.

DESCRIPTION

Figure 1:
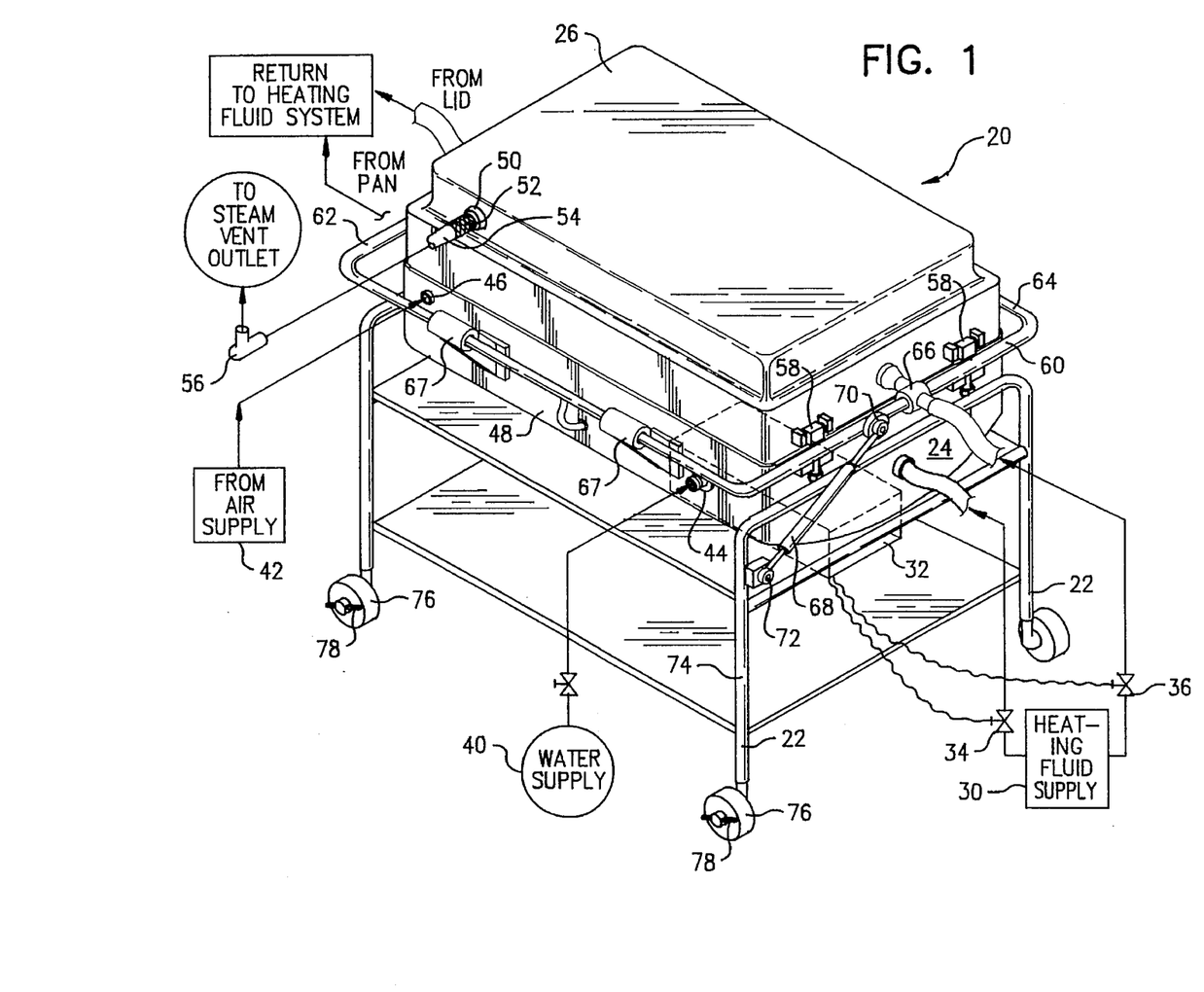

Referring now to the drawing and to the reference characters therein, FIG. 1 depicts, in its operative cooking position, a cooking apparatus 20 constructed in accord with, and embodying, the principles of the present invention.

Major components of the cooking apparatus 20 include: a lower frame or base portion 22, a bottom pan portion 24 which is supported from the base portion 22, and a combination grille and lid top portion 26. The top 26 is supported in a manner so that it can be opened in order to place the food to be cooked (not shown) into the pan portion 24, and so that the top 26 can be inverted about one hundred eighty degrees (180°) and thereafter used as a grille, as will be further described and illustrated herein below In one embodiment, the top or lid portion 26 and the bottom or pan portion 24 are each double-walled vessels having inner and outer walls with a fluid receiving passageway therebetween, as can be readily seen in FIG. 4 below. Returning to FIG. 1, a heating fluid supply source 30 provides a heating fluid such as hot oil or steam to heat the bottom pan 24 and the top lid 26. A control unit 32 controls the supply of heating fluid to pan 24 and lid 26 via way of regulation devices such as valves 34 and 36 respectively.

As it may be desirable to add steam or air directly to the interior formed between the bottom pan 24 and lid 26 of the cooking apparatus 20, a water supply 40 and an air supply 42 are provided to the cooling apparatus 20. Preferably, connection both the water supply 40 and air supply 42 is by way of a flexible hose (not shown) attached to a quick connect type fitting 44 (for water) and 46 (for air) as indicated at the rear 48 of pan 24. Vapors resulting from both the introduction of air or steam, or from the cooking of foods, are allowed to escape from the interior of the apparatus 20 and are vented through the top 26 via way of a steam vent outlet 50. This outlet 50 is also preferably provided via way of a quick connect fitting 52 attached to a flexible hose 54. Normally, a vent outlet system also includes pressure regulating means such as an adjustable pressure relief valve 56, so that the cooking apparatus 20 may be used as a pressure cooker. Valve 56 allows the cook to set the internal pressure of the apparatus 20 somewhat above atmospheric pressure up to a rated pressure such as 8 psig (and normally not above 15 psig). When used as a pressure cooker, the cooking apparatus 20 may have the top 26 secured to bottom pan 24 via way of snap levers or similar fasteners 58.

Figure 4:
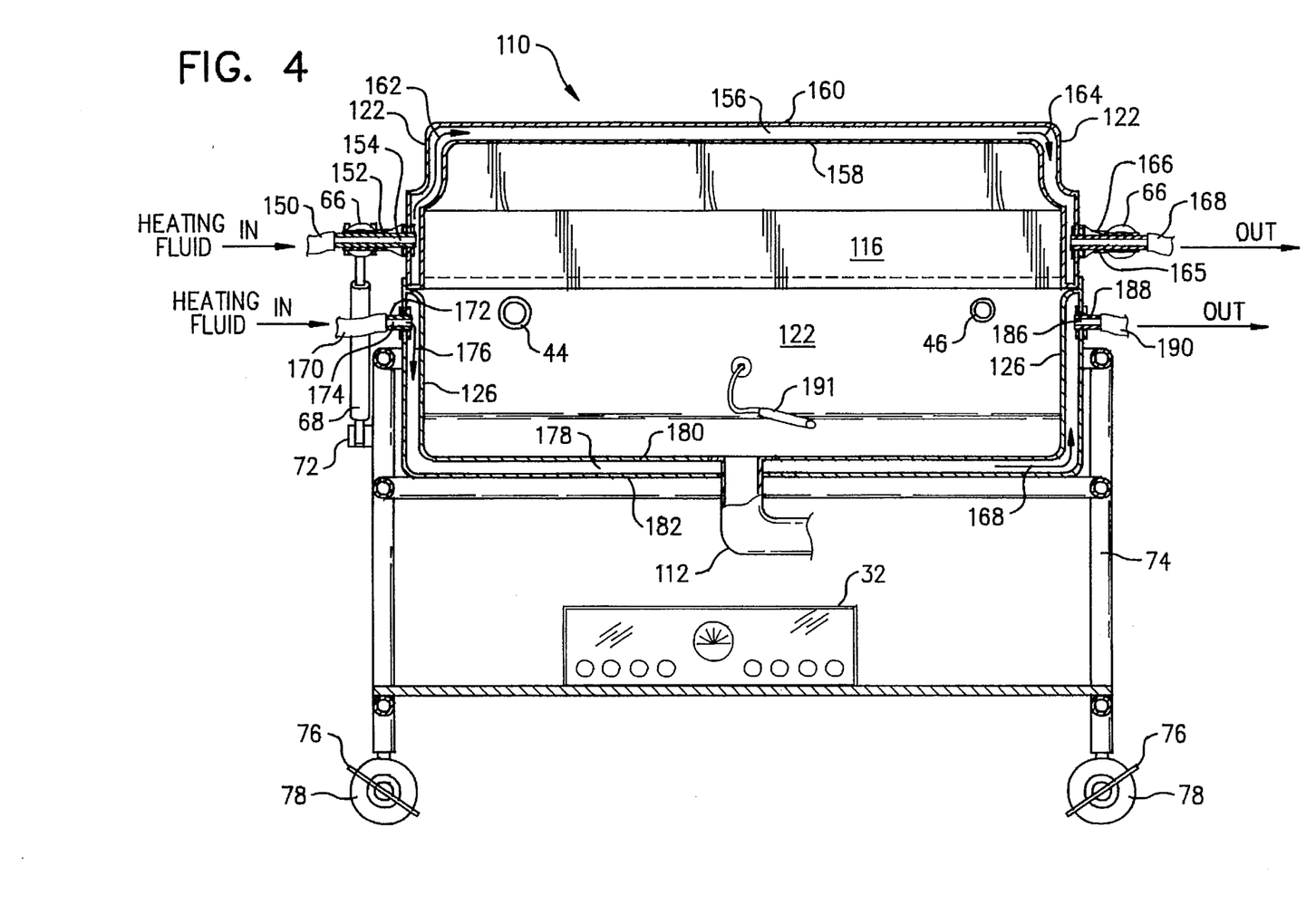
FIG. 4 is a vertical cross sectional view of my cooking apparatus, shown with the top compartment of the cooking apparatus positioned in the cooking or broiling position, and additionally showing the flow passageways for a heating fluid.

As illustrated in this FIG. 1, the top 26 is supported by, and rotates within and between the left 60 and right 62 ends of upper frame 64. A pivot joint 66 at the left end 60 and companion joint 66 on right end 62 of frame 64 provide the freedom of movement necessary for rotation of top 26. Movement of top 26 is possible once the top is raised to an open position as illustrated in FIG. 4 below.

The upper frame 64 is in turn supported from the rear 48 of pan 24 by hinges 67. A combination spring lift/shock damper 68 is positioned between a first pivot pin 70 at upper frame 64 and a second pivot pin 72 affixed to the rear 74 of base 22. The purpose of the shock damper 68 is primarily to prevent the top 26 from closing at an undesirably rapid rate from an open position. Damper 68 may also assist in slightly biasing the frame 64 toward an open position. For ease in moving the cooking apparatus 20 between locations in a kitchen, or to assist with access for cleaning, base 22 is provided with rollers 76, preferably with locking mechanism 78 to prevent the cooking apparatus 20 from moving when set at a desired location.

Figure 2:
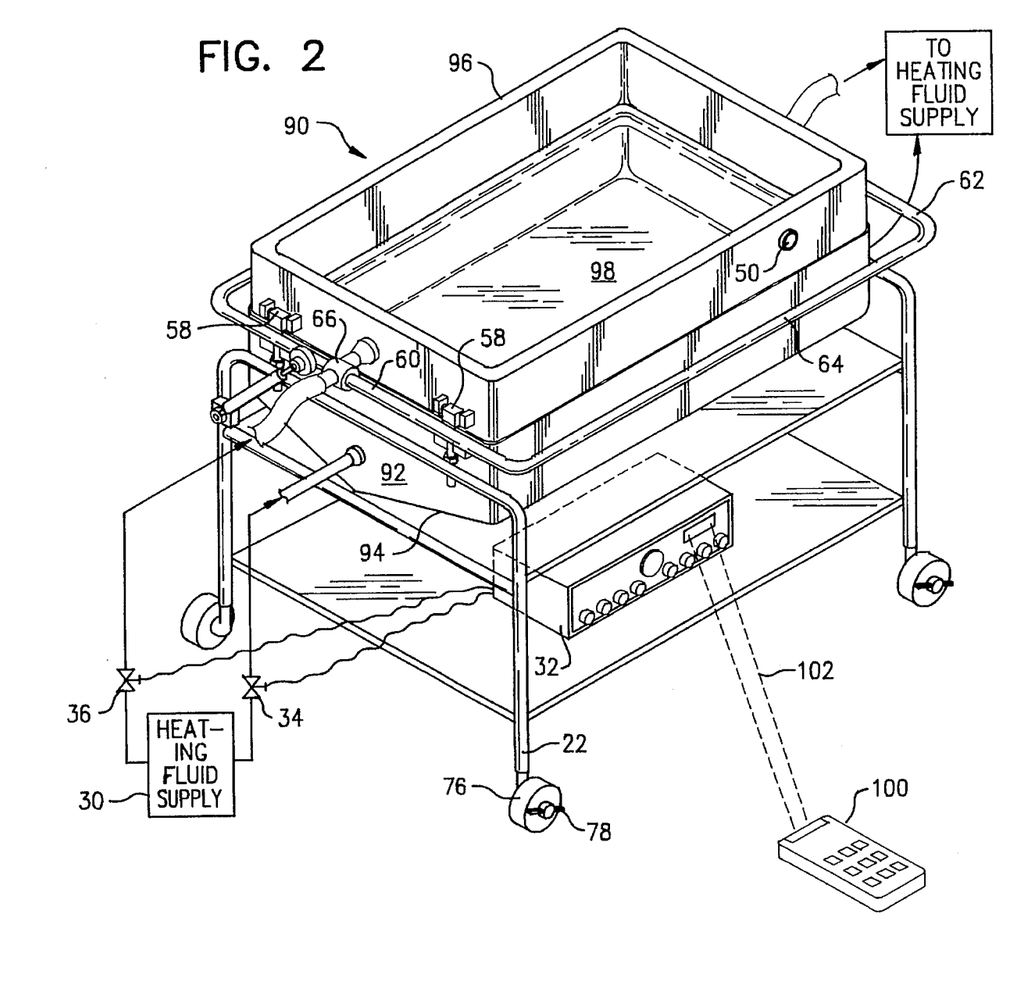
FIG. 2 is a perspective view of the lower or pan portion of a second embodiment of the cooking apparatus constructed in accord with the principles of the present invention, showing the use of flat segments in the lower pan portion, and also illustrating the use of a remote control device for setting the cook conditions.

Attention is now directed at the rounded bottom 80 of pan 24 as shown in FIG. 1. This type of construction may be desirable in many applications, such as pressure cooker usage, but it generally increases the cost of apparatus 20. In contrast, in FIG. 2 is shown a second embodiment of my invention, cooking apparatus 90, which is similar to apparatus 20 shown in FIG. 1, but constructed with a lower pan 92 having a segmented flat bottom 94. The flat bottom 94 construction is somewhat cheaper to fabricate, and also may be more desirable for some types of cooking such as stir-fry or other oriental type cooking techniques.

Also in FIG. 2, the lid or top 96 is turned upside down as compared to top 26 of FIG. 1. Therefore, in FIG. 2, lid 96 is shown with its interior, grill forming surface 98 upward. Quick conversion of the top portion 96 between a lid or cooking position, as illustrated in FIG. 1, and a grill position, as shown in FIG. 2, by way of simple rotation of the top portion 96, is a unique and important advantage of my cooking apparatus 20.

A remote control unit 100 is also shown in this FIG. 2. The remote control unit 100 can be used to program or reprogram the control unit 32 on the cooking apparatus 90. Typical remote control units 100 use an infrared signal 102 which is broadcast from the remote control unit 100 and is received at the control unit 32, similar to television or video recorder type remote control units. The use of a remote control unit 100 may be especially important in some institutional settings, such as prisons, where it may be desirable to set or reset the cooking device independently and without the ability of local personnel to immediately readjust the control unit 32, so as to prevent the occurrence of sabotage to the cooking cycle.

Figure 3:
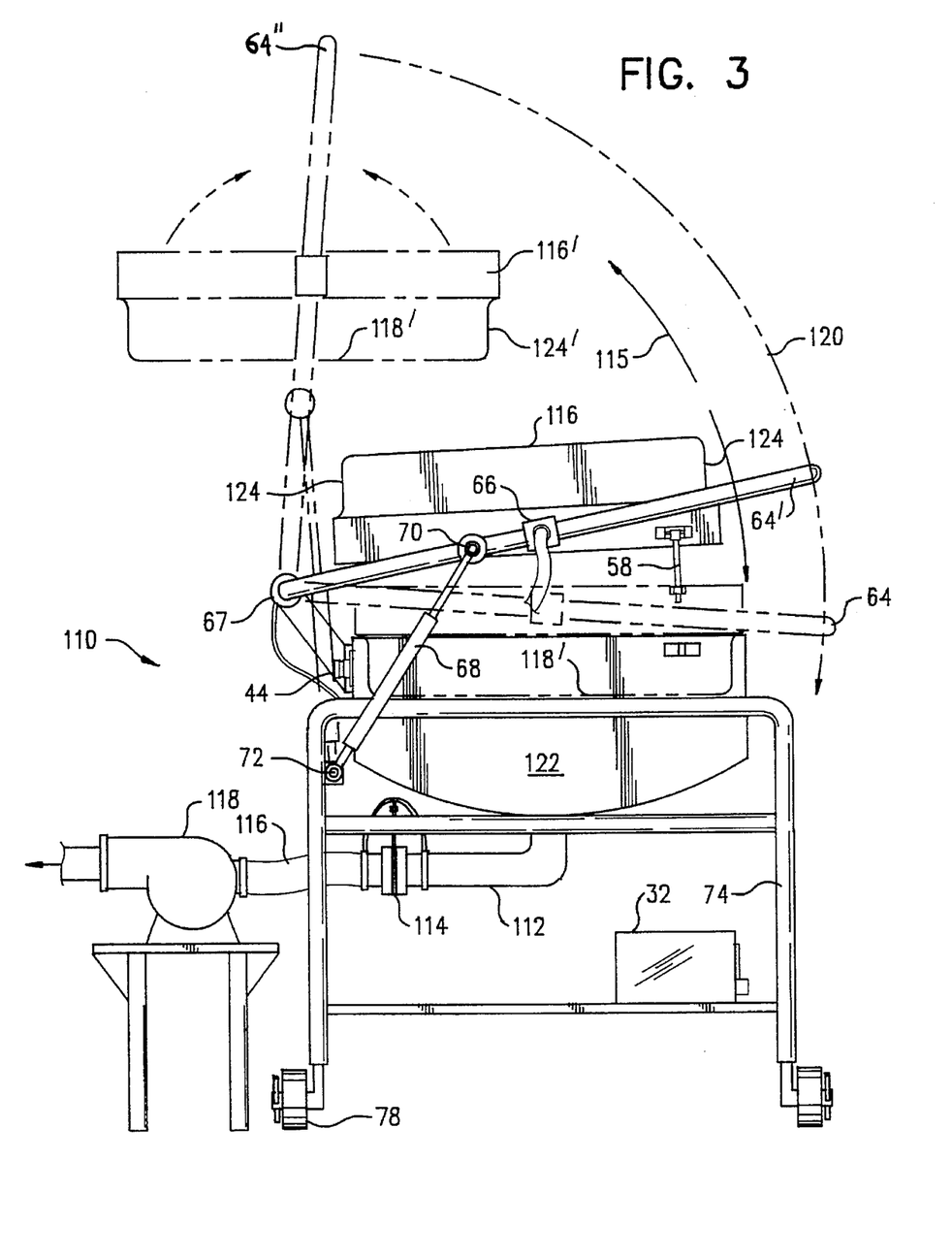
FIG. 3 is a side view of a cooking apparatus similar to that set forth in FIG. 1 above, constructed in accord with the present invention with the upper or lid portion initially indicated in the cooker or broiler position, and also showing in hidden lines the upper compartment at an open position wherein the upper compartment is being inverted to the grille position.

Turning now to FIG. 3, a side view of a cooking apparatus 110 is shown. Apparatus 110 is similar to the apparatus 20 first shown in FIG. 1 above, although here a bottom drain line 112 is also shown. This line 112 is preferably supplied in stainless steel of any desired size to accommodate the cooking apparatus size; for conventional sized units a nominal three inch (3") line 112 is satisfactory. Output from the drain line 112 is controlled by a knife type valve 114, and a line 116 to an outlet pump 118 is provided. The discharge from an outlet pump 118 may be sent to a cryovac pump and fill type bagging system (not shown) or other system for receiving the food slurry leaving the cooking apparatus 110. For example, chili may be cooked in cooking apparatus 110, and then drained through line 112 and pumped into cryovac bags to be cooled down in an ice bath for subsequent storage and/or freezing. This drain 112 feature is important since cooking apparatus 110 may be normally of a forty (40) to eighty (80) gallon size for commercial or institutional service, with a unit in the sixty (60) gallon size range expected to be commonly required.

In FIG. 3 the transformation of the top portion 116 from cooking service to grill service is illustrated in hidden lines. The top portion 116 is shown in cooking service or a lid position in solid lines. By moving upper frame 64 upward, in the direction of reference arrow 115, through the position indicated by reference numeral 64' and on upward to the position indicated by reference numeral 64" clearance is achieved to rotate the top portion 116 to the grille position indicated by reference numeral 116'. An interior grill surface 118' is provided, which is upward when the top portion 116' is turned upward. When the top portion is moved downward in the direction of reference arrow 120 and nested in the pan 122, the top portion 116 provides a convenient grille surface 118. Note that the top portion 116 has a lower outer sidewall portion 124 which is sized for the close fitting insertion necessary to nest the lid 116 against the inner wall 126 (See FIG. 4 below) of the bottom pan 122.

Turning now to FIG. 4, a vertical cross section of cooling apparatus 110 is shown. In this FIG. 4, the double wall construction of both the bottom pan portion 122 and the top lid portion 116 are readily apparent. Heating fluid contained in hose 150 flows enters the lid portion 116 through inlet 152. Inlet 152 has a fluid passageway 154 therein which communicates with passageway 156 in lid 116. Passageway 156 is defined between the inner 158 and outer 160 walls of lid 116. The heating fluid circulates in passageway 156 as indicated by reference arrow 162, so as to heat inner wall 158. The circulating heating fluid then proceeds through the lid 116 as indicated by reference arrow 164, then leaves lid 116 through passageway 165 in outlet 166, thence to hose 168. During the period of heating provided by contact of the heating fluid with inner wall 158, sufficient heat must be applied to heat the food on grille portion 118, or as necessary to provide a portion of the heat required to heat the food in the bottom pan 122 (when and as it is used).

Similar to the process just described for the lid portion 116, heating fluid enters the lower pan 122 through hose 170 and inlet 172 having a passageway 174 therein. Heating fluid then proceeds downward in the direction of reference arrow 176 in the passageway 178 which is defined between inner bottom wall 180 and outer bottom wall 182. Heating fluid exits in the direction of reference arrow 184 and proceeds through passageway 186 in outlet 188, thence on through outlet hose 190. Just as described with reference to cooking apparatus 90 in FIG. 2 above, the flow of heating fluid to either the upper 116 or lower 122 portions of apparatus 110 may be regulated by control valves or the like (not shown) to control the cooking temperature to any desired level as regulated by control unit 32. Feedback to the control unit 32 may be provided by way of temperature sensing unit 191.

Figure 5:
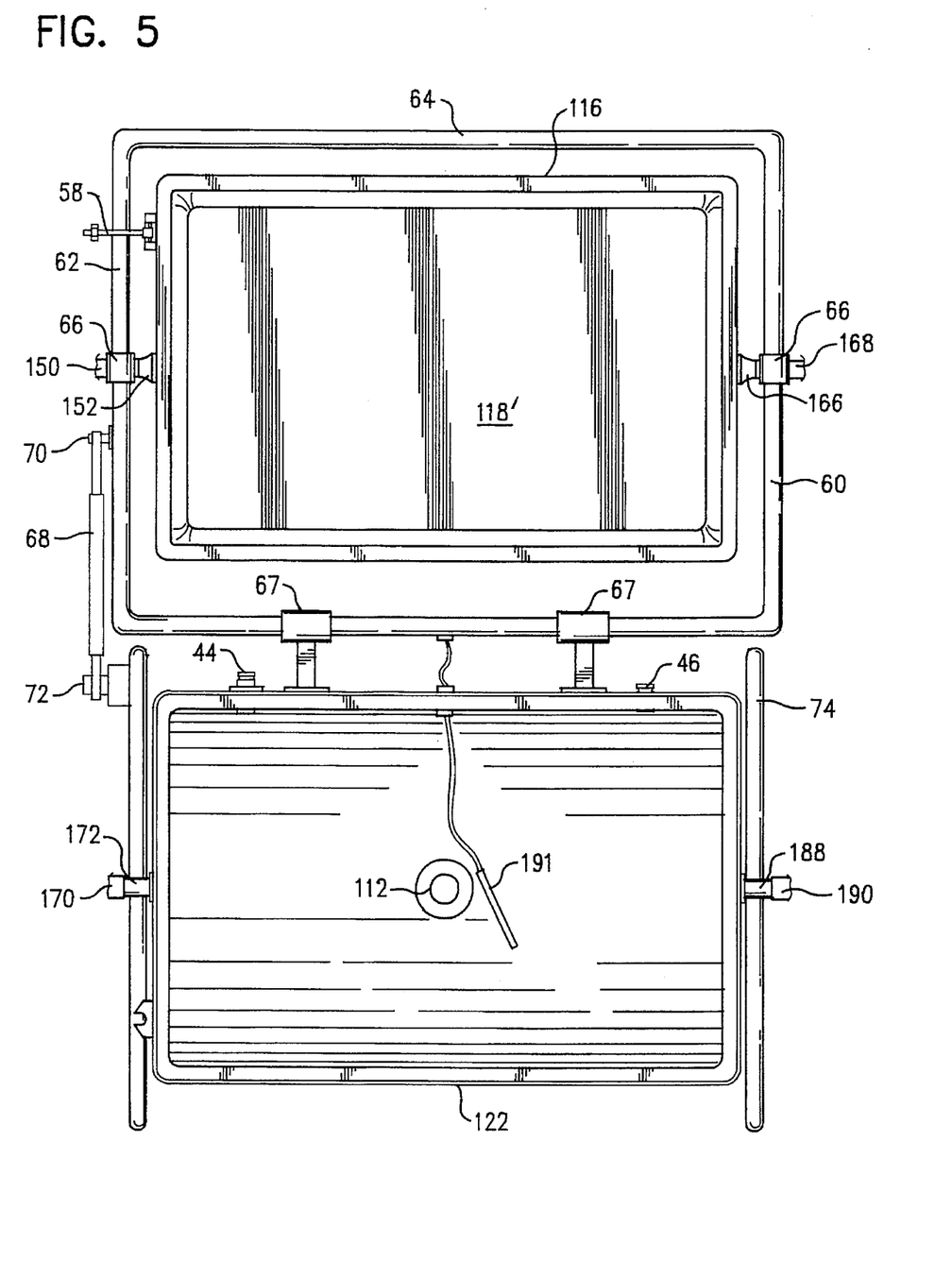
FIG. 5 is a top plan view of the embodiment of the cooking apparatus shown in FIG. 1 above, now with the upper compartment opened outward horizontally in an extended position so as to fully reveal the cooking surfaces in both the bottom and the top portions.

Attention is now directed to FIG. 5, wherein a top plan view of the apparatus 110 which was first depicted in FIG. 3 above is set forth. Here, the upper portion 116 is fully extended outward, and has been rotated along with the upper frame 64 so that the grille surface 118 is upwardly exposed. Also, it can be further seen how the right side 60 and left side 62 of upper frame 64 support rotary joints 66. The joints 66 allow the upper lid portion 118 to rotate and to receive heating fluid by way of the inlet 152 and outlet 166 fittings which pass therethrough.

Figure 6:
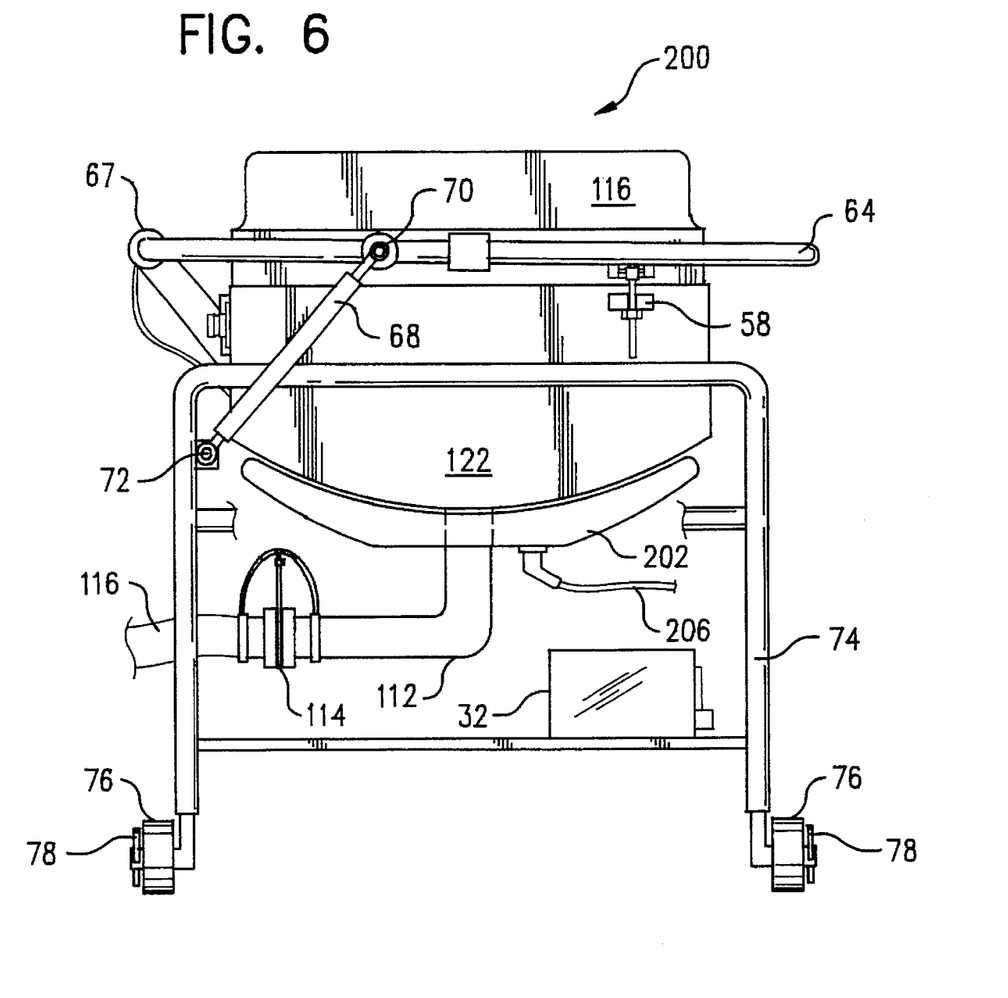
FIG. 6 is a third embodiment of my invention, showing the use of a gas heating system to heat the kettle.

FIG. 6 illustrates a cooking apparatus 200, which illustrates a third embodiment of my invention. Apparatus 200 is different from the first or second embodiments in that heating is provided by way of gas burners 202 under the bottom pan portion 122. Gas may be supplied via hose 206 from natural gas, propane, or other suitable supply source. In this embodiment, the upper portion 116 is heated with electricity.

In the same manner as set forth in the earlier embodiments, the top portion of the cooking apparatus is rotatably secured between left and right sides of the upper frame portion, so that the top portion can be readily changed between the cooking and grilling configurations.

Figure 7:
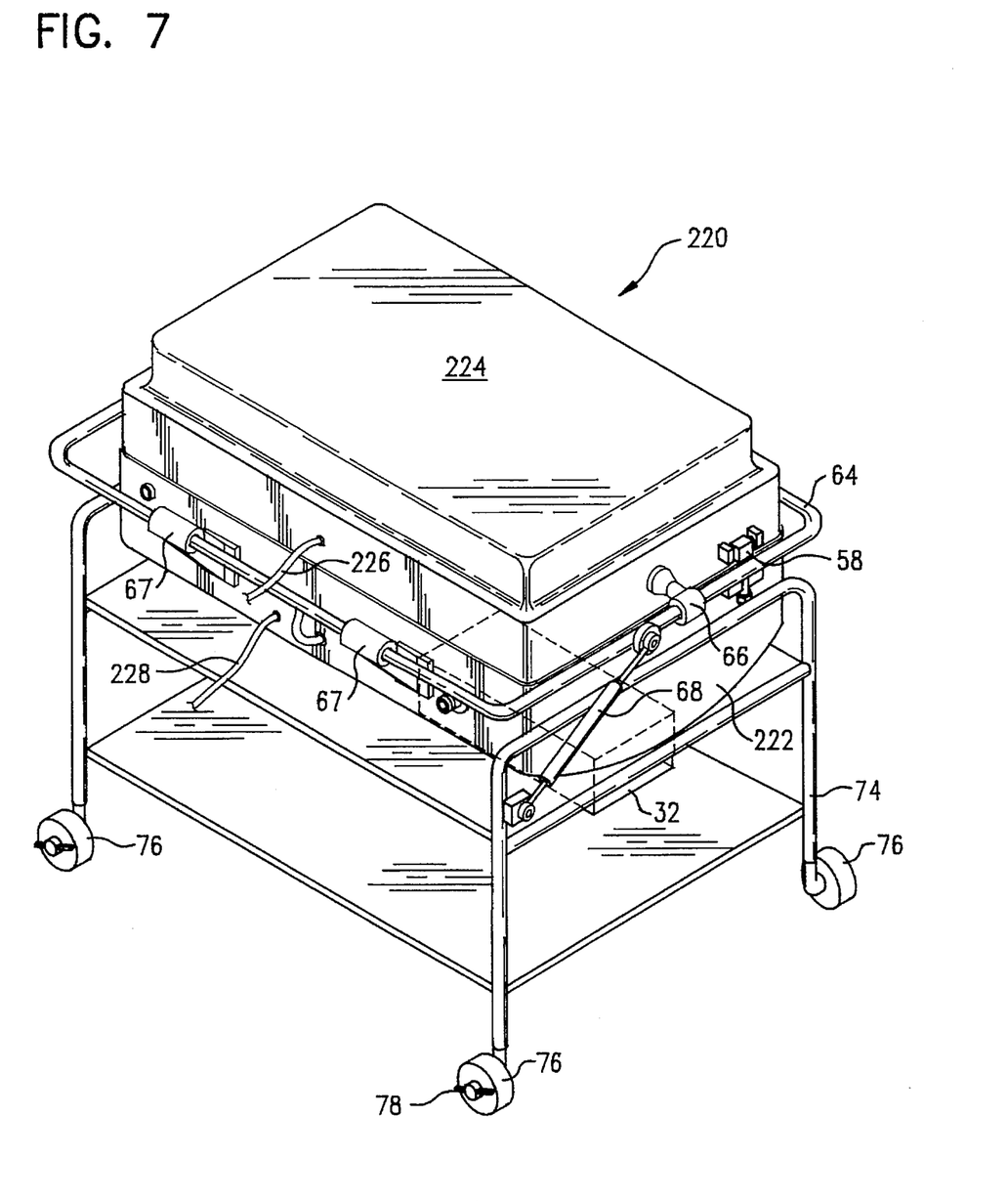
FIG. 7 is a fourth embodiment of my cooking device, showing the use of electrical heating elements to heat the upper and lower grilles.

Still another embodiment of my invention is set forth in FIG. 7. This embodiment is similar to the designs set forth in the earlier figures, however, heating is provided to apparatus 220 via way of electric heating elements (not shown) which are supplied to lower pan 222 and upper pan 224 via shielded electrical power cables 226 and 228, respectively.

It is clear from the heretofore described figures that the present invention as described by cooking apparatus 20, 90, 110, 200, or 220 above provides a simple convertible dutch oven type apparatus which may be easily rotated between operating positions, and which may be releaseably secured at either position.

It will be readily apparent to the reader that the present invention may be easily adapted to other embodiments incorporating the concepts taught herein and that the present figures are shown by way of example only and not in any way a limitation. The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalences of the claims are therefore intended to be embraced therein.

What is claimed is:

1. An apparatus for heating foods, liquids, or slurries, said apparatus comprising:
   (a) a lower frame portion,
   (b) a lower pan portion, said pan portion supported by said lower frame portion,
   (c) an upper frame portion, said upper frame portion pivotally supported from said lower pan portion, and
   (d) a lid portion,
      (i) said lid portion pivotally affixed to said upper frame portion, and
      (ii) said lid portion including a top portion and a grille portion,
   (e) said upper frame portion further comprising
      (i) a left end, said left end further comprising a first pivot means, and
      (ii) a right end, said right further comprising a second pivot means,
   (f) wherein said first and second pivot means allow said lid portion to be rotated one hundred eighty degrees when said upper frame portion has been raised from
      (i) a closed, fitting position, wherein said lid is in place on said bottom portion,
      (ii) to an extended, open position, wherein said frame is sufficiently upward so that said lid portion may be rotated so as to convert said lid portion to a grille portion, and
   (g) wherein said grille portion is upwardly exposed when said lid portion has been rotated the said approximate one hundred eighty degrees, and
   (h) wherein said lid portion is shaped such that said portion may be lowered into and nested in said bottom portion when said upper frame portion has been returned to the resting position.

2. The apparatus as set forth in claim 1, wherein
   (a) said lower pan portion further comprises a double wall portion, said double wall portion including an inner and an outer wall which form a passageway therebetween, said passageway having an inlet and an outlet,
   (b) said lid portion further comprises a double exterior wall portion, said double wall portion including an inner and an outer wall with a passageway therebetween, said passageway having an inlet and an outlet,
   (c) whereby a heating fluid may be passed
      (i) into said passageway in said pan portion, or
      (ii) into said passageway in said lid portion, or
      (iii) simultaneously into said pan portion and said lid portion passageways, so as to heat said foods, liquids, or slurries contained by said apparatus.

3. The apparatus as set forth in claim 2, further including a first regulating means to regulate the flow of said heating fluid into said bottom pan portion.

4. The apparatus as set forth in claim 3, further including a second regulating means to regulate the flow of said heating fluid into said lid portion.

5. The cooking vessel of claim 1 wherein the means for heating comprises an electric heater.

6. The device as defined in claim 1, further comprising a latching means, said latching means suitable for securing said top portion to said bottom portion, said latching means being of sufficient strength so as to withstand a predetermined pressure within the compartment by securing said top portion and said bottom portion together.

7. The device as defined in claim 2, wherein said upper lid portion further comprises a top portion adapted to be received in upper opening part of said bottom portion.

* * * * *